United States Patent [19]

van den Berg

[11] Patent Number: 5,225,129
[45] Date of Patent: Jul. 6, 1993

[54] METHOD FOR THE MANUFACTURE OF POLYMER PRODUCTS FROM CYCLIC ESTERS

[75] Inventor: Hendrik J. van den Berg, Oirsbeek, Netherlands

[73] Assignee: DSM N.V., Geleen, Netherlands

[21] Appl. No.: 732,415

[22] Filed: Jul. 18, 1991

[30] Foreign Application Priority Data

Jul. 19, 1990 [NL] Netherlands ............... 9001614

[51] Int. Cl.$^5$ ............................................. B29C 45/00
[52] U.S. Cl. ......................... 264/85; 264/257; 264/258; 264/314; 264/328.6; 264/331.21; 264/328.17; 528/357
[58] Field of Search ........... 528/357; 264/510, 331.12, 264/328.4, 328.17, 328.19, 257, 258, 314, 328.6, 331.21, 85

[56] References Cited

U.S. PATENT DOCUMENTS

| | | | |
|---|---|---|---|
| 3,284,417 | 11/1966 | Hostettler et al. | 528/357 |
| 3,917,722 | 11/1975 | Yates | 502/168 |
| 4,057,537 | 11/1977 | Sinclair | 528/357 |
| 4,071,507 | 1/1978 | Schoen | 528/357 |
| 4,225,691 | 9/1980 | Crivello | 264/328.2 |
| 4,268,467 | 5/1981 | Wagner | 264/111 |
| 4,374,059 | 2/1983 | Wagner | 523/153 |
| 4,524,044 | 6/1985 | Nishiyama et al. | 264/328.6 |
| 4,743,257 | 5/1988 | Tormala et al. | 264/331.21 |
| 4,746,726 | 5/1988 | Evans et al. | 528/371 |
| 4,788,170 | 11/1988 | Wengrovius | 502/152 |
| 4,816,548 | 3/1989 | Evans et al. | 528/370 |

FOREIGN PATENT DOCUMENTS

| | | | |
|---|---|---|---|
| 0106545 | 4/1984 | European Pat. Off. | |
| 0108635 | 5/1984 | European Pat. Off. | |
| 0372221 | 6/1990 | European Pat. Off. | |
| 1153902 | 9/1963 | Fed. Rep. of Germany | 528/357 |
| 55-104315 | 8/1980 | Japan | 528/357 |
| 56-058844 | 5/1981 | Japan | |
| 57-072846 | 5/1982 | Japan | |
| 63-064710 | 3/1988 | Japan | |
| 859639 | 1/1961 | United Kingdom | 528/357 |
| 1000401 | 8/1964 | United Kingdom | 528/357 |
| 1040168 | 8/1966 | United Kingdom | 528/357 |

OTHER PUBLICATIONS

Kubiak et al., The Development of Non-Urethane Materials for the RIM Process, 45th Annual Technical Conference, Reinforced Plastics/Composites Institute, The Society of the Plastics Industry, Inc. 1980 pp. 1-7.
J. C. O'Brien et al, Transfer Molding, Modern Plastics Encyclopedia 1988, pp. 299-300.

*Primary Examiner*—Catherine Timm
*Attorney, Agent, or Firm*—Cushman, Darby & Cushman

[57] ABSTRACT

A method for the manufacture of polymer products from cyclic esters, according to which a catalyst and cyclic monomers are mixed in a mixing chamber and are optionally brought to a higher temperature, after which the mixture is injected, under pressure, into a cavity of a mold consisting of at least two parts and the mold is heated for some time at a temperature above the melting temperature of the monomers, after which the mold is opened and the product is removed from the mold. Polymer products manufactured by this method can be used in medical fields and particularly in reconstructive orthopedics.

25 Claims, No Drawings

METHOD FOR THE MANUFACTURE OF POLYMER PRODUCTS FROM CYCLIC ESTERS

The invention relates to a method for the manufacture of polymer products from cyclic esters, according to which an amount of cyclic monomers is mixed with a catalyst and polymerized.

BACKGROUND OF THE INVENTION

Such a method is known from EP-B-0.108.635, according to which an amount of cyclic monomers and an amount of catalyst are transferred to a glass reactor under dry conditions, for example under a dry stream of $N_2$. The reactor is sealed and the monomers and the catalyst are melted and mixed. The polymer is removed from the reactor on completion of the reaction.

In view of the fact that a polymerized polymer of cyclic esters is a rigid piece of material, it is usually only possible to remove the material from the reactor by breaking the glass wall of the reactor. This is a great drawback for applications on an industrial scale, characterized by the production of many pieces of material.

With a method according to EP-B-0.108.635 the material obtained has to be processed by milling or melting in order to obtain an object with a usable shape. Milling presents the drawback that a large amount of waste is obtained, which is economically and ecologically disadvantageous. Melting presents the drawback that the microscopic, molecular, structure of the material obtained immediately after polymerization, the so-called "as polymerized" material, is lost. Several publications state that the "as polymerized" structure presents advantages; see for example Makromol. Chemie, 188, pp. 1809-1814, 1987.

Moreover, a number of bonds in the polymer will be broken in melting and as a result the molecular weight of the polymer will decrease.

With a reactor without a separate mixing chamber as in the conventional method, in order to mix the monomer and catalyst composition the entire reactor is shaken or a magnetic stirring bar is used. Neither of these methods leads to a desirable degree of mixing of the catalyst and monomer. On the other hand, by mixing the catalyst and monomer in a specially designed mixing chamber, a much better mixing occurs. Furthermore, when a stirring bar is used, there is the undesirable result of having the stirring bar incorporated in the product.

SUMMARY OF THE INVENTION

The invention relates to a method for manufacturing polymer products from cyclic esters which solves the problems discussed above.

According to the invention, the catalyst and the cyclic monomers are mixed in a mixing chamber and are optionally heated, after which the mixture is injected, under pressure, into a cavity of a mold consisting of at least two parts, which mold is heated at a temperature above the melting temperature of the monomers, after which the polymerization is allowed to take place at least partially, after which the mold is opened and the product is removed from the mold.

Such a method is usually referred to as Reaction Injection Molding (RIM). RIM is for example described in U.S. Pat. No. 4,524,044 hereby incorporated by reference. U.S. Pat. No. 4,524,044 describes RIM for lactams, not for cyclic esters as the present invention.

The method according to the invention can be used to manufacture blocks consisting of the polymer product. From these blocks objects of a desired shape can then be produced via a finishing step. It is also possible to produce objects directly in the shape required, without an extensive additional finishing step.

A further advantage of a RIM method for the processing of cyclic esters is that it is possible to fill a mold much more effectively than with the conventional method. In the conventional method the components that are to react melt in the reactor, which means that the distribution is effected by means of gravity. In contrast, according to the present invention, the overpressure, with which the components are injected into the mold, enables good filling of all angles and depressions in the mold.

A further advantage of a RIM method for the processing of cyclic esters is that the monomers and the catalyst are mixed in a mixing chamber. This enables a good distribution of the catalyst throughout the monomers and, consequently, good polymerization.

The catalyst and the monomers can be brought into the mixing chamber at room temperature or any other temperature. In the mixing chamber, the monomers and the catalyst can be heated to a temperature at which the mixture obtains a viscosity that is suitable for injection. This is generally above the melting point of the monomers. After the mixture is injected into the mold, it is further heated, if necessary, to the reactor temperature. The mold can be pre-heated or can be heated after injection. Preferably the mold is maintained at a constant temperature during a complete serie of processes according to the invention.

DETAILED DESCRIPTION OF THE INVENTION

The cyclic esters which are polymerized by a catalyst according to the invention can be chosen from, for example, lactones such as lactide, glycolide, ε-caprolactone, dioxanone, 1,4-dioxane-2,3-dione, beta-propiolactone, tetramethyl glycolide, beta-butyrolactone, gammabutyrolactone or pivalolactone, or cyclic carbonates such as trimethylene carbonate, 2,2-dimethyl trimethylene carbonate and the like.

The lactones can consist of the optically pure isomers or of two or more optically different isomers.

In addition, comonomers based on hydroxycarboxylic acids can be incorporated to, for example, 50 wt. % but preferably to no more than about 10 wt. %. They can be chosen from, for example, the group comprising:
α-hydroxybutyric acid,
α-hydroxyisobutyric acid,
α-hydroxyvaleric acid,
α-hydroxyisovaleric acid,
α-hydroxycaproic acid,
α-hydroxyisocaproic acid,
α-hydroxy-α-ethylbutyric acid,
α-hydroxy-β-methylvaleric acid,
α-hydroxyheptanoic acid,
α-hydroxyoctanoic acid,
α-hydroxydecanoic acid,
α-hydroxymyristic acid and
α-hydroxystearic acid or their intermolecular cyclic esters or combinations thereof.

Cyclic esters and their (co)polymers such as for example: poly(L-lactide); poly(D,L-lactide); poly(mesolactide); poly(glycoilide); poly(trimethylenecarbonate); poly(epsilon-caprolactone); poly(L-lactide-co-D,L-lactide); poly(L-lactide-co-meso-lactide); poly(L-lactide-co-glycolide); poly(L-lactide-co-trimethylenecarbonate); poly(L-lactide-co-epsilon-caprolactone); poly(D,L-lactide-co-meso-lactide); poly(D,L-lactide-co-glycolide); poly(D,L-lactide-co-trimethylenecarbonate); poly(D,L-lactide-co-epsilon-caprolactone); poly(-meso-lactide-co-glycolide); poly(meso-lactide-co-trimethylenecarbonate); poly(meso-lactide-co-epsilon-caprolactone); poly(glycolide-co-trimethylenecarbonate); and poly(glycolide-co-epsilon-caprolactone).

Cyclic esters are used as raw materials for polyesters when high molecular weights are required. With ring-opening polymerization it is possible to continue the reaction to obtain polyesters with high molecular weights. With a polycondensation reaction it is only possible to obtain polyesters with relatively low molecular weights.

As catalysts in the method according to the invention, use can be made of the usual catalysts known to a person skilled in the art. Examples of such catalysts are the catalysts mentioned in EP-B-0.108.635, namely tin octoate, antimony trifluoride, zinc powder, dibutyl tin oxide and tin oxalate.

Preferably, use is made of a catalyst characterized in that it consists of a compound according to Formula I:

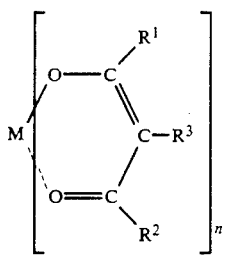

where M is a metal ion and n is a number between 1 and 4, equal to the valence of the metal ion, and groups $R^1$ and $R^2$ are, independently of one another, an alkyl, aryl or cycloaliphatic group and $R^3$ is an alkyl, aryl or cylcoaliphatic group or a hydrogen atom. It is also possible for the alkyl, aryl or cycloaliphatic groups forming part of $R^1$, $R^2$ or $R^3$ to be substituted by halogens.

M is preferably chosen from a group comprising tin, zinc, lead, bismuth, cobalt, iron, manganese and copper ions, more preferably from a group of tin, zinc and iron ions and most preferably from zinc or iron ions. If n is greater than 1, groups $R^1$ through $R^3$ can differ from one another in the various configurations. With zinc and tin ions, the bivalent ions are preferred.

The catalyst according to Formula I is advantageous in that the groups $R^1$ through $R^3$ can be chosen so that, at a desired temperature, the catalyst according to Formula 1 is soluble in the monomers which are to be catalyzed.

It is also possible to obtain a catalyst according to Formula I in a particularly pure form.

If M consists of zinc or iron, a catalyst according to Formula I presents the added advantage that any resulting metabolic residue will have a low toxicity.

Groups $R^1$ through $R^3$ can be chosen independently of another from alkyl groups with between 1 and 20 carbon atoms, with or without unsaturated bonds, aryl groups or cycloaliphatic groups or several of groups $R^1$ through $R^3$ together constitute cycloaliphatic ring structures. $R^1$ and $R^2$ are preferably linear or branched aliphatic chains with between 2 and 6 carbon atoms.

Groups $R^1$ through $R^3$ are preferably chosen so that the catalyst has a melting point below the melting temperature or in any case below the polymerization temperature of the cyclic esters whose reaction is to be catalyzed. If this is not the case it is possible that, as the catalyst melts in the cyclic ester liquid, the monomers will start to polymerize around the still undissolved catalyst salt, thus forming a polymer casing, which will prevent further dissolution. Particularly at low polymerization temperatures, this slows down the polymerization rate considerably.

A catalyst with a melting point that is lower than the melting or polymerization temperature of the monomers to be polymerized is in the context of the invention understood to be a catalyst that dissolves in the monomers. This is because the advantage is achieved if the catalyst is practically molecularly distributed among the monomers to be polymerized.

If group M consists of $Zn^{2+}$ then groups $R^1$ and $R^2$ together preferably consist of, in total, between 2 and 6 carbon atoms; in the case of the polymerization of lactones, group $R^1$ more preferably consists of tertiary butyl and group $R^2$ of ethyl. $R^3$ is then preferably H. In that case the compound is called zinc-bis(2,2-dimethyl-3,5-heptaneodionato -0,0'). The advantage of such a compound is that it has a melting point that lies below the polymerization temperature of most lactones, including lactide and glycolide.

If group M consists of $Sn^{2+}$, groups $R^1$ and $R^2$ preferably consist of methyl and group $R^3$ of H. The compound is then called tin(II)-bis(2,4-pentanedionato-0,0'). This compound also presents the advantage that it has a melting point that lies below the polymerization temperature of most lactones, including lactide and glycolide.

A second Sn catalyst with good properties is a compound according to Formula I, where groups $R^1$ and $R^2$ consist of t-butyl and $R^3$ of H. This compound has a melting point of about 84° C. This tin compound presents the added advantage that it is more stable during storage than the already known tin octoate.

A compound according to Formula I can be obtained via the usual synthesis routes, such as those described by Kopeckey et al., J. Org. Chem. 27 1036 (1962) and by Finn et al., J. Chem. Soc. (1938), pp. 1254–1263.

If groups $R^1$, $R^2$ and $R^3$ are correctly chosen then the catalyst according to Formula I will have a melting temperature that lies below these polymerization temperatures. This is an advantage because otherwise the catalyst will in some cases become encapsulated, as described above.

It is possible to use the catalyst according to Formula I in combination with other catalysts. This is of particular advantage if these other catalysts also meet the requirements formulated above for the aforementioned catalyst, in particular the solubility requirement in the material to be polymerized and the low toxicity requirement.

The monomer/catalyst molecular ratio can on the whole be chosen between 1,000 and 300,000 and is preferably chosen between 5,000 and 30,000 (mol/mol).

The temperature during mixing is chosen such that the components are in a liquid state or can be dispersed to such fine particles that the reaction can take place without problems. Preferably the reactants are molten during or before the mixing.

The reaction temperature is between 80° and 180° C., preferably between 105° and 130° C.

The pressure used to inject the mixture into the mold is preferably 0.1–5 bar higher than the pressure in the mold, and more preferably 0.15 to 0.5 bar higher. The pressure is obtained with the aid of an inert gas such as argon, helium or nitrogen. Preferably, use is made of nitrogen. It is possible to reduce the pressure in the mold to for example 0.001 bar either before or after the mixture is injected. In the last case the reduced pressure is applied at the top of the mold.

Preferably, the reaction is allowed to take place under $N_2$. This gives the further advantage that it is not necessary to maintain a vacuum in the mould. Generally, moulds used for RIM are not fitted to maintain a closed vacuum with the mould construction: an external pump is necessary. Use of such a pump has the disadvantage that volatile monomers from the reaction mixtures are sucked out of the mould.

This reaction time distinguishes the RIM of these cyclic esters from conventional RIM systems, in which reaction cycles of 1 to 10 min are generally applied.

It is preferable to use the various components in the purest possible form. If nitrogen is used in the process then the nitrogen must have a low oxygen content. Cyclic monomers should contain very little contamination due to ring-opened cyclic monomers. The amount of $H_2O$ in the reaction must also be minimized.

The required polymerization duration depends on, among other factors, the desired molecular weight and the desired residual monomer content. For example in the case of polylactide, a low residual monomer content can be advantageous when a low decomposition rate of the polymer implant is desired. In general, a polymerization duration of from 30 to 200 hours and preferably from 70 to 200 hours will lead to good results.

Preferably, the degree of conversion is greater than 95%, more preferably greater than 98%. The resultant intrinsic viscosity is preferably greater than 8, more preferably greater than 11.

It is possible to obtain polymers with viscosity averages of molecular weights of up to at least $1 \times 10^6$. For example, it is possible to synthesize poly-L-lactide, poly-D-lactide or poly-D,L-lactide.

With the catalyst according to Formula I, it is possible to obtain a new polyester composition in which the polyester has a molecular weight of between 100,000 and 10,000,000 and an intrinsic viscosity of more than 4, obtained by polymerization of cyclic esters in the presence of the catalyst. The resulting polyester composition contains between 20 and 500 ppm zinc and also less than 1,000 ppm of other metals derived from a catalyst.

The product obtained after the polymerization is removed from the mold and can be touched up if necessary. For example, the sprue can be removed. If the cavity in the mold has more or less the shape of the desired end product, as is preferable, the amount of touching up required will be much less than the usual amount obtained when conventional methods are used.

Polymers produced with a method according to the invention can be used in numerous fields, but are particularly advantageous as bio-resolvable material in biomedical applications and particularly in reconstructive orthopedics, as described in the literature. The polymers can be produced with high molecular weights and have good mechanical properties, which enable them to be used as, for example, bone-setting aids such as plates and screws.

It is also possible to melt the polymers after production and to cast them in certain shapes. However, this presents the drawback that the specific "as polymerized" structure is broken and, consequently, the specific advantages resulting from the "as polymerized" structure are lost. This applies particularly to the crystallinity of the structure. Due to the relatively poor thermal stability of the polymers and to mechanical effects, the polymer chain is broken in several places in melt processing and the resultant mechanical properties are poorer.

The invention also presents the possibility of incorporating fibrous reinforcement in the polymer material. This can be done by, for example, mixing short fibers with one or both of the liquid components and then injecting them into the mold along with the components. Such a method is usually referred to as reinforced RIM or R-RIM.

Preferably, the fibrous reinforcement is placed in the mold before the monomer liquid is injected. During injection, the monomers are then washed around the fibrous reinforcement, thus wetting the reinforcement. Such wetting improves the adhesion of the fiber to the matrix and thus causes an overall improvement with respect to the final strength of the composite thus formed. Such a method is usually referred to as structural RIM or S-RIM.

The fibrous reinforcement can be in the form of, for example, loose fibers, fabrics or mats. The fibers can have any length or thickness. The fibrous reinforcement can be chosen from all materials available. Preferably, a material is chosen that retains its mechanical properties under the reaction conditions of the method according to the invention.

Examples of fiber materials which can be used in the invention are carbon, glass, aramide, natural fibers such as flax or jute, polyethylene, polyamide and the like.

If the polyester material is intended for use in medical applications it is preferable to choose a fibrous material that is compatible with biological systems.

If the polyester material is biodegradable, it can be advantageous to use a fibrous reinforcement that is also biodegradable. This may be a fiber composed of lactide, glycolide, caprolactone and the like or mixtures thereof.

The mixing chamber can be a mixing chamber of the type commonly used in RIM methods.

Preferably, the mixing chamber is a heatable chamber in which the materials present can be mixed and in which there are devices for building up a pressure sufficient to inject the mixture from the mixing chamber into the mold.

The mold used for the method can consist of any material that is commonly used or suitable according to the state of the art. Preferably, the mold consists at least partly of metal, for example steel or surgical steel.

The inside of the mold can be treated to effect a better release of the polymer material from the mold. This treatment can consist of polishing or coating with a release layer. A release layer can consist of Teflon TM or of some other polymer material, precious metal coating, titanium nitride, etc.

Preferably, the mold parts are fitted with means for heating the mold, such as oil pipes or electric heating elements, or there are provisions for placing the mold in its entirety in a heated area.

If a large number of relatively small objects are to be produced in shapes that are virtually the final desired shapes, it is preferable in terms of process technology, to connect a series of molds to the mixing chamber and to place the entire series of molds in an area having the desired temperature and, optionally, pressure.

It is also possible to place a bag, made of a flexible material, in the mold before injection and to then inject the mixture into this bag. This is for example described in the Patent Abstracts of Japan, Volume 5, no. 119 (M-81)(791) of 31 July 1981. In this abstract however is not described that this is possible with cyclic esters as in the invention. Use of a bag according to the invention presents the advantage that if the bag is sealed after injection a sealed reaction chamber is obtained. Any pathogenic microorganisms cannot penetrate into this sealed reaction chamber. Any microorganisms already present in the mixture is destructed during polymerization. If the polymer material is removed from the mold together with the already sealed bag, the material will remain sterile in the bag. This means that the material no longer has to be sterilized before use, which is a substantial advantage. A secondary advantage of this bag arrangement is that the requirements usually imposed on the walls of the mold can be considerably less stringent, which makes production easier. Polymer material which is polymerized in a bag will presumably have some form of wrinkling on the surface of the material because the bag has not entirely followed the surface of the mold or because the bag has seams. If necessary, these irregularities can be removed by slight machining. Furthermore, if the bag has a smaller volume than the mold and stretches when it is filled, it is possible to achieve virtually no wrinkles on the surface of the polymer material.

Another possibility is to shape the bag in situ in the mold by inflating an amount of material suitable for forming a bag into the mold. This has the advantage of giving a bag which follows the shape of the mold better and has no seams.

EXAMPLES

The invention will be elucidated by means of the following examples without being limited thereto.

The $T_m$ and the $\Delta H$ of specimens of approximately 10 mg were measured by means of DSC, using a calibrated Perkin Elmer DSC-7 and a scanning rate of 10° C. min$^{-1}$.

The intrinsic viscosity was determined with the aid of an Ubbelohde viscometer, type Oa, in chloroform at 25° C.

The viscosity average of molecular weight was determined using the formula:

$$[\eta] = (5.45 \times 10^{-4}) \times M_v^{0.73}$$

according to A. Schindler and D. Harper, J. Polym. Sci., 17, 2593-2599 (1979), where $\eta$ is the measured intrinsic viscosity and $M_v$ is the viscosity average of molecular weight.

NMR spectra were recorded using 400 MH$_2$ NMR equipment. The flexural modulus (E), the flexural strength ($\sigma$) and the elongation at break (e.a.b.) were determined by means of the flexural test according to ASTM-D-97.

The tensile modulus or Young's Modulus (E), the tensile strength ($\sigma$) and the elongation at break (e.a.b.) were determined by means of the tensile test according to ISO-527, type 2.

The IZOD impact strength was determined according to ASTM 256-A.

EXAMPLE I

A mold made of Cr-Ni-Mo steel (type 316L), measuring 140×115×27.5 mm (inside measurements), heated at 120° C. in a Lauda thermostat, was filled with a reacting L-lactide mixture in the following manner: the mold was attached to a thermostatted mixing vessel with a volume of 0.50 dm$^3$ via a sealable coupling. A pressure of 1 bar nitrogen (O$_2$ content <5 ppm; with a dew point at −40° C. as regards H$_2$O content) was applied via several vacuum/nitrogen cycles. Then the coupling between the mixing vessel and the mold was sealed and the mixing vessel was filled with 399 grams of L-L-dilactide (CCA Biochem), with discharge of N$_2$. After the lactide crystals had been melted at 120° C., 79.8 mg of tin octoate was injected with the aid of a Hamilton syringe. After 10 minutes' mixing by means of stirring, the reacting melt was introduced into the mold at an elevated pressure of 1.2 bar. The mold was disconnected and maintained at 120° C. for 66 hours, after which it was cooled and opened.

The shape obtained had a milky white appearance. A sample showed that the polymer had an intrinsic viscosity ($\eta$) (CHCl$_3$, 25° C.) of 9.1 g/dl and a residual monomer content of 0.3%. Thermal analysis yielded a $\Delta H_m$ of 71.1 J/g, a $T_m$ of 186.3° C. and a $T_g$ of 59.6° C. The $M_v$ was calculated from the $\eta$ and was found to be about 600,000. The following mechanical properties were determined of the shape obtained:
Flexural test: E=4.9 GPa, $\sigma$=118 MPa, e.a.b.=4.4%
test: E=4.8 GPa, $\sigma$=56 MPa, e.a.b. TM 6.4%
mpact test: Izod=3.3+0.1 kJ/m$^2$.

EXAMPLE II

In the same manner as in example I a mixture of 386 g of L,L-dilactide and 34 g of D,L-lactide was catalyzed by 63 mg (0.015 wt. %) of tin octoate for 65 hours at 120° C.: $\eta$=9.1 g/dl; the residual monomer content was 1.5%, the $\Delta H_m$ was 28.4 J/g; the $T_m$ was 153.3° C. and the $T_g$ was 57.0° C. The mechanical properties were good.

What is claimed is:

1. Method of manufacturing a polymer product from cyclic monomers comprising the steps of:
   combining the cyclic monomers and a catalyst in a mixing chamber to form a mixture,
   injecting the mixture, under pressure, into a cavity of a mold having at least two parts, which mold is heated to a temperature above the melting temperature of the monomers, whereby the monomers polymerize
   allowing the polymerization to take place in the mold for 30 to 200 hours to obtain a degree of polymerization greater than 95% and an intrinsic viscosity of the polymer product greater than 8,
   opening the mold to remove the product from the mold,
   wherein the cyclic monomers are selected from the lactone group consisting of lactide, glycolide, ε-caprolactone, dioxanone, 1,4-dioxane-2,3-dione, beta-propiolactone, tetramethylglycolide, beta-butyrolactone, gamma-butyrolactone, pivalolactone, and the cyclic carbonate group consisting of trimethylene carbonate, 2,2-dimethyltrimethylene carbonate, and mixtures thereof, and wherein the catalyst is tin cotoate, antimony trifluoride, zinc powder, dibutyl tin oxide, tin oxalate or a compound according to Formula I:

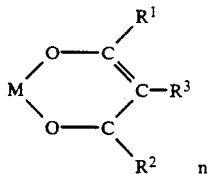
I

M being a metal ion and n being a number between 1 and 4, equal to the valence of the metal ion, and $R^1$ and $R^2$ being, independently of one another, an alkyl, aryl or cycloaliphatic group, and $R^3$ being an alkyl, aryl or cycloaliphatic group, or a hydrogen atom.

2. Method according to claim 1, wherein each of lactide, glycolide, ε-caprolactone, dioxanone, 1,4-dioxane-2,3-dione, beta-propiolactone, tetramethylglycolide, beta-butyrolactone, gamma-butyrolactone, and pivalolactone consists essentially of optically pure isomers.

3. Method according to claim 1, wherein each of lactide, glycolide, ε-caprolactone, dioxanone, 1,4-dioxane-2,3-dione, beta-propiolactone, tetramethylglycolide, beta-butyrolactone, gamma-butyrolactone, and pivalolactone consists essentially of a mixture of two or more optically different isomers.

4. Method according to claim 1, wherein the alkyl, aryl or cycloaliphatic groups are substituted by halogen.

5. Method according to claim 1, wherein the catalyst is a compound according to Formula I, M is $Zn^{2+}$, $R^1$ is a tertiary butyl group, $R^2$ is an ethyl group and $R^3$ is hydrogen.

6. Method according to claim 1, wherein the catalyst is a compound according to Formula I, M is $Sn^{2+}$, $R^1$ and $R^2$ are methyl groups and $R^3$ is hydrogen.

7. Method according to claim 1, wherein the monomer/catalyst molecular ratio is from 1,000 to 300,000 (mol/mol).

8. Method according to claim 7, wherein the monomer/catalyst molecular ratio is from 5,000 to 30,000 (mol/mol).

9. Method according to claim 1, wherein the mold comprises walls made at least partially of steel.

10. Method according to claim 1, wherein the cyclic monomers are allowed to react at a temperature wherein said cyclic monomers are in a liquid state.

11. Method according to claim 10, wherein the temperature is in a range from 80° to 180° C.

12. Method according to claim 11, wherein the range is from 105° to 130° C.

13. Method according to claim 1, wherein the polymerization is allowed to take place for from 70 to 200 hours to obtain a degree of conversion greater than 98% and an intrinsic viscosity of the polymer product greater than 11.

14. Method according to claim 1, wherein the cavity of the mold defines a shape substantially the same as a shape of the product to be manufactured.

15. Method according to claim 1, wherein, in the injecting step, the mixture is injected into a bag of flexible material previously placed in the mold.

16. Method according to claim 15, wherein the bag is smaller than the cavity in the mold, thereby causing the bag to stretch when the mixture is injected.

17. Method according to claim 15, wherein the bag is introduced into the mold by inflating an amount of material into the mold to form a bag on an inside surface of the mold.

18. Process according to claim 15, wherein the product is removed from the mold in the bag.

19. Method according to claim 1, wherein an amount of fibrous reinforcement is combined with the mixture during the combining step.

20. Method according to claim 19, wherein the fibrous reinforcement is biocompatible.

21. Method according to claim 19, wherein the fibrous reinforcement is biodegradable.

22. Method according to claim 1, wherein an amount of fibrous reinforcement is brought into the mold before the injecting step.

23. Method according to claim 22, wherein the fibrous reinforcement is biocompatible.

24. Method according to claim 22, wherein the fibrous reinforcement is biodegradable.

25. Process according to claim 1, wherein the polymerization is allowed to take place under $N_2$.

* * * * *

UNITED STATES PATENT AND TRADEMARK OFFICE
CERTIFICATE OF CORRECTION

PATENT NO. : 5,225,129
DATED : July 6, 1993
INVENTOR(S) : van den Berg

It is certified that error appears in the above-indentified patent and that said Letters Patent is hereby corrected as shown below:

On the title page, item [30]: Foreign Application Priority Data,

[30]  Jul. 19, 1990 [NL] Netherlands ..... 9001641

Signed and Sealed this

Twenty-seventh Day of September, 1994

Attest:

BRUCE LEHMAN

*Attesting Officer*   *Commissioner of Patents and Trademarks*